United States Patent
Bashyam

(10) Patent No.: US 11,777,104 B2
(45) Date of Patent: Oct. 3, 2023

(54) DRY FUEL CELL ELECTRODES AND METHODS OF MANUFACTURE

(71) Applicant: HYZON MOTORS INC., Honeoye Falls, NY (US)

(72) Inventor: Rajesh Bashyam, Delta (CA)

(73) Assignee: HYZON MOTORS INC., Honeoye Falls, NY (US)

( * ) Notice: Subject to any disclaimer, the term of this patent is extended or adjusted under 35 U.S.C. 154(b) by 0 days.

(21) Appl. No.: 17/563,219

(22) Filed: Dec. 28, 2021

(65) Prior Publication Data
US 2022/0209249 A1 Jun. 30, 2022

Related U.S. Application Data

(60) Provisional application No. 63/131,389, filed on Dec. 29, 2020.

(51) Int. Cl.
- *H01M 4/88* (2006.01)
- *H01M 8/1004* (2016.01)
- *H01M 4/92* (2006.01)

(52) U.S. Cl.
CPC ....... *H01M 4/8828* (2013.01); *H01M 4/8892* (2013.01); *H01M 4/926* (2013.01); *H01M 8/1004* (2013.01)

(58) Field of Classification Search
CPC . H01M 2004/8684; H01M 2008/1095; H01M 4/8652; H01M 4/8668; H01M 4/8814; H01M 4/8828; H01M 4/8892; H01M 4/923; H01M 4/926; H01M 8/10; H01M 8/1004
See application file for complete search history.

(56) References Cited

U.S. PATENT DOCUMENTS

| | | | |
|---|---|---|---|
| 2006/0105225 A1 | 5/2006 | Kim et al. | |
| 2008/0128074 A1 | 6/2008 | Mah et al. | |
| 2017/0279143 A1 | 9/2017 | Tsukuda et al. | |
| 2019/0288318 A1 | 9/2019 | Edmundson et al. | |

FOREIGN PATENT DOCUMENTS

WO 2019193500 A1 10/2019

OTHER PUBLICATIONS

Written Opinion of the International Searching Authority dated Mar. 15, 2022.

*Primary Examiner* — Victoria H Lynch
(74) *Attorney, Agent, or Firm* — Jacob M. Ward; Ward Law Office LLC

(57) ABSTRACT

Ways of making electrodes and electrodes produced thereby are provided. Dry blending of a powder mixture including a catalyst, an ionomer, and a polyether forms a blended mixture, which can be comminuted to obtain a desired particle size. A slurry of the blended mixture is formed with an aqueous medium and the slurry is coated onto a substrate to form a coated substrate. The coating can be transferred to another substrate or material for use as an electrode and/or the substrate of the coated substrate can form part of a structure, such as a membrane electrode assembly for use in a fuel cell.

20 Claims, 1 Drawing Sheet

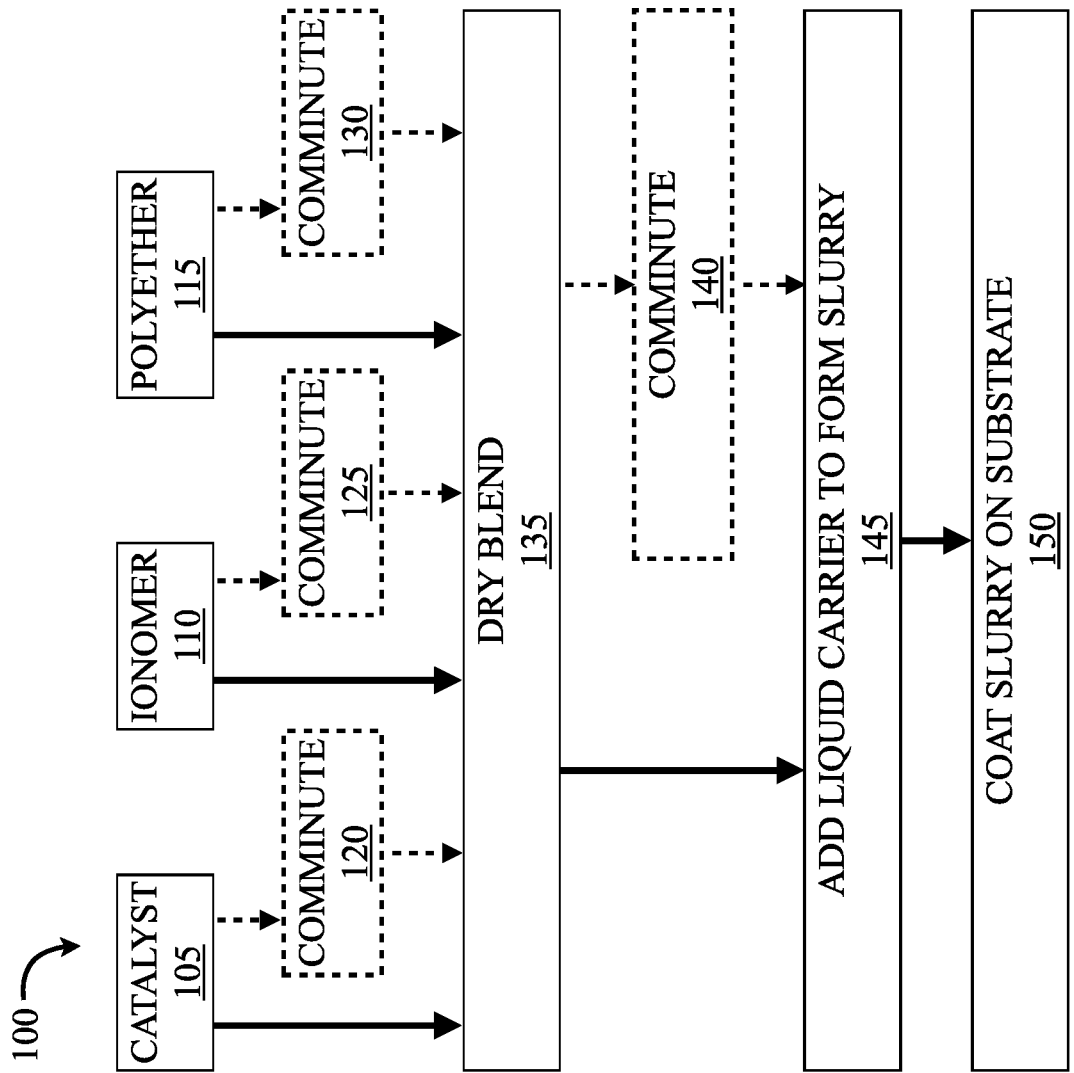

DRY FUEL CELL ELECTRODES AND METHODS OF MANUFACTURE

CROSS-REFERENCE TO RELATED APPLICATIONS

This application claims the benefit of U.S. Provisional Application No. 63/131,389 filed on Dec. 29, 2020. The entire disclosure of the above application is hereby incorporated herein by reference.

FIELD

The present technology relates to electrodes, including ways of blending dry materials to form electrodes, dry fabrication of fuel cell electrodes, and where such electrodes are used in membrane electrode assemblies and fuel cells.

INTRODUCTION

This section provides background information related to the present disclosure which is not necessarily prior art.

Fuel cell systems can be used as power supplies in numerous applications, such as vehicles and stationary power plants. Such systems can deliver power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Proton-exchange membrane fuel cells (PEM fuel cells), also referred to as polymer-electrolyte membrane fuel cells, can employ a membrane electrode assembly (MEA) comprised of a proton exchange membrane (e.g., proton conducting ionomer) disposed between two electrodes, namely a cathode and an anode. A catalyst typically facilitates the desired electrochemical reactions at the electrodes. Separator plates or bipolar plates, including plates providing a flow field for directing the reactants across a surface of each electrode, and/or various types of gas-diffusion media, can be disposed on each side of the MEA.

In operation, the output voltage of an individual fuel cell under load can be below one volt. Therefore, in order to provide greater output voltage, multiple fuel cells can be stacked together and can be connected in series to create a higher voltage fuel cell stack. End plate assemblies can be placed at each end of the stack to hold the stack together and to compress the stack components together. Compressive force can provide sealing and adequate electrical contact between various stack components. Fuel cell stacks can then be further connected in series and/or parallel combinations with other fuel cell stacks or power sources to form larger arrays for delivering higher voltages and/or currents.

Fuel cell electrodes can include one or more catalysts and can be formed in various ways. Catalysts used in the electrodes of the MEA can include one or more various metals, including noble metals and alloys thereof, embedded and/or supported on various types of media, including proton conducting media. A carbon-supported catalyst can be used in fuel cell electrodes at both the anode and the cathode for the respective hydrogen oxidation and oxygen reduction reactions. Electrodes including the catalysts can be formed using various inks, including solutions and/or suspensions of various materials and particles. Certain fuel cell electrodes are made using wet catalyst inks that employ one or more organic solvents (e.g., alcohol) for wetting, dispersing, and smoother processing of the electrode components.

Forming electrodes using organic solvents, such as alcohol, and the nature of wet catalyst inks present certain issues in manufacture of fuel cell electrodes. Such manufacturing issues can include undesired swelling of ionomers, reaction of catalyst(s) with alcohol(s) generating organic byproducts that can get adsorbed to the catalyst (e.g., platinum) and negatively affect the resulting fuel cell performance. Wet catalyst inks used to form electrodes, for example, can have solids anywhere between about 7% and about 25% by weight and accordingly may need to be appropriately dried after coating or depositing onto a substrate to form an electrode. Drying of the coated, deposited, or cast ink can result in cracking of the catalyst layer and/or the formation of various imperfections in the resulting electrode. What is more, certain alcohols can leach non-precious transition metal alloys from the catalyst. On the other hand, making and coating aqueous catalyst inks without alcohol can also be a challenge by presenting solution and/or suspension issues, as well as drying issues in forming electrodes from such catalyst inks.

Accordingly, there is a continuing need for optimizing the fabrication of electrodes for use in MEAS and PEM fuel cells.

SUMMARY

In concordance with the instant disclosure, optimized electrodes, electrodes disposed adjacent proton-exchange membranes, including membrane electrode assemblies formed thereby, fuel cells including such membrane electrode assemblies, and methods of making such articles have been surprisingly discovered.

The present technology relates to ways of making electrodes. A powder mixture including a catalyst, an ionomer, and a polyether is dry blended to form a blended mixture. A slurry of the blended mixture is formed with a liquid carrier. The slurry is coated onto a substrate to form a coated substrate. Each of the catalyst, the ionomer, and the polyether can be separately comminuted prior to the dry blending and/or the blended mixture can be comminuted prior to formation of the slurry.

The catalyst can include various aspects. The catalyst can include a noble metal and/or a noble metal alloy. The noble metal can include platinum, ruthenium, and/or iridium. Carbon particle supported metals and alloys thereof can be included in the catalyst, where certain examples can include platinum/carbon, platinum alloy/carbon, iridium ruthenium oxide, ruthenium iridium oxide, iridium oxide/niobium oxide, and various combinations thereof. In certain embodiments, the platinum alloy can include platinum-cobalt, platinum-nickel, and/or platinum-iron.

The ionomer can include various aspects. The ionomer can include one or more various proton conducting polymers. The ionomer can include a polyelectrolyte that comprises copolymers containing both electrically neutral repeating units and a fraction of ionized units. In certain embodiments, the ionomer includes a sulfonated tetrafluoroethylene-based fluoropolymer-copolymer.

The polyether can include various aspects. Embodiments include where the polyether is comprised by one or more polyalkylene oxides. Such polyalkylene oxides can be formed from using ethylene oxide, propylene oxide, and/or butylene oxide, for example. Particular embodiments employ polyethylene oxide having an average molecular weight of at least about 20,000 g/mol.

The method can employ various comminuting steps at various points therein. Certain embodiments include comminuting the catalyst, the ionomer, and/or the polyether prior to dry blending the powder mixture. Comminuting the catalyst, the ionomer, and/or the polyether can be performed to obtain an average particle size of about 0.25 microns to about 0.5 microns. In addition to, or in lieu thereof, it is also possible to comminute the blended mixture prior to forming the slurry of the blended mixture with the liquid carrier, where the comminuting results in an average particle size of about 0.25 microns to about 0.5 microns.

Forming and using the slurry can include various aspects. For example, forming the slurry of the blended mixture with the liquid carrier can include a ratio of blended mixture to liquid carrier of about 4:1 to about 6:1. The slurry can be coated onto the substrate to form the coated substrate includes using a slot-die. Other coating and application processes can be used to apply the slurry to the substrate. In certain embodiments, the substrate is in the form of a web and the coating operation can include a continuous application of the slurry to the web, where one of the web and an applicator of the slurry moves relative to the other.

The substrate onto which the slurry is coated can include various aspects. The substrate can include an ionomer, such as a sulfonated tetrafluoroethylene-based fluoropolymer-copolymer, which can be used to configure the electrode as a cathode. The substrate can include a fluoropolymer, which can be used to configure the electrode as an anode. Examples of the fluoropolymer include polytetrafluoroethylene and ethylene tetrafluoroethylene.

The coated substrate can be subjected to one or more additional treatments or processing steps. The coated substrate can be laminated with another substrate, can be heated, and/or can have pressure applied thereto. A portion of the coating from the coated substrate can be transferred onto one side of an ionomer membrane. Likewise, another portion of the coating of the coated substrate can be transferred onto another side of the ionomer membrane. In this way, a membrane electrode assembly can be formed that includes two electrodes produced according to the present technology. The membrane electrode assembly can be used in constructing one or more fuel cells.

Further areas of applicability will become apparent from the description provided herein. The description and specific examples in this summary are intended for purposes of illustration only and are not intended to limit the scope of the present disclosure.

DRAWINGS

The drawing described herein is for illustrative purposes only of a selected embodiment and not all possible implementations, and is not intended to limit the scope of the present disclosure.

The FIGURE is a representative flowchart of an embodiment of making an electrode according to the present technology, where stippled boxes and stippled arrows indicate optional comminuting steps.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology is drawn to ways of optimizing the manufacture of electrodes for use in fuel cells that minimize defects, loss of metals, and formation of undesired byproducts. In this way, catalyst function of the electrode, including both anodes and cathodes used in MEAS of PEM fuel cells, can be maximized and electrodes can be formed in a more efficient manner. Methods of making an electrode are provided where a powder mixture including a catalyst, an ionomer, and a polyether is dry blended to form a blended mixture. A slurry is formed of the blended mixture with a liquid vehicle. And the slurry is coated onto a substrate to form a coated substrate. Depending on the substrate, the coated substrate can be used as an electrode, or the coating of the coated substrate can be transferred to another material or membrane.

The catalyst can include the following aspects. The catalyst can include one or more noble metals and/or noble metal alloys. The noble metal and/or the noble metal portion of the noble metal alloy can include platinum, ruthenium, and/or iridium. The catalyst can include a metal and/or noble metal deposited onto various particles, such as carbon particles. Larger particles and/or heterogeneous mixtures of particles can be comminuted to a smaller preselected size and to provide a substantially homogenous particle size distribution. The catalyst can include one or more of platinum/carbon, platinum alloy/carbon, iridium ruthenium oxide, ruthenium iridium oxide, iridium oxide/niobium oxide, as well as various combinations thereof. Where present, the platinum alloy can include platinum-cobalt, platinum-nickel, and/or platinum-iron. As noted, the catalyst can include a metal deposited onto an electrically conductive particle, such as various carbon particles. Such electrically conductive particles can be selected to have various porosities, sizes, and surface areas. It is also possible to mix various types of catalysts, including various metals deposited on various types of particles.

Where the catalyst includes one or more metals deposited onto carbon particles, the carbon particles can have various porosities, sizes, and average surface area values. Embodiments include where the carbon particles include average surface area values that can range from about 50 $m^2/g$ to about 125 $m^2/g$, from about 125 $m^2/g$ to about 300 $m^2/g$, and/or from about 300 $m^2/g$ to about 1200 $m^2/g$, as well as mixtures of such carbon particles. Examples of carbon particles include activated carbon available from Cabot Carbon Ltd., including activated carbon black available under the tradenames Vulcan™ XC-72 and BLACK PEARLS™.

To form the catalyst, a catalyst precursor can be deposited on the carbon particles. The catalyst precursor can interact with the carbon particles based upon the respective surface area, porosity, and proportion thereof in a selected mixture. The catalyst precursor can include a platinum precursor and/or one or platinum alloy precursors. Examples of platinum precursors include platinum acetylacetonates, platinum nitrate, hexachloroplatinic acid, trimethyl (methyl cyclopentadienyl) platinum, and various metalorganic compounds and surfactants. Examples of platinum alloy precursors include similar compounds having platinum alloys. The catalyst precursor can be heat labile such that subsequent heating and exposure to various sources of thermal energy can result in at least a partial decomposition of the catalyst precursor. In certain embodiments, the catalyst precursor can be heat labile to where an organic portion of the precursor effectively decomposes, breaks down, and/or volatilizes, leaving a metal or metal alloy deposited on the carbon particles.

The ionomer can include the following aspects. The ionomer can include various proton conducting polymers. The ionomer can include a polyelectrolyte that comprises copolymers containing both electrically neutral repeating units and a fraction of ionized units. Various types of copolymers can be included in the ionomer, including copolymers having depending functional groups such as carboxylic acid groups and/or sulfonate groups as ionized groups. The ionomer can include a sulfonated tetrafluoroethylene-based fluoropolymer-copolymer. Certain embodiments include where the ionomer includes Nafion™ from DuPont. In certain embodiments, the ionomer can include the same ionomer present in a proton-exchange membrane to which the electrode will be associated with in forming an MEA for use in a PEM fuel cell. The ionomer can be provided as particles of various sizes and uniformities that can be comminuted to a preselected size and to provide a substantially homogenous particle size distribution. The ionomer itself, or one or more other polymers or materials associated therewith, can be at least partially thermoplastic so that particles thereof can be heated and at least softened or even partially melted. This can allow the particles, as well as other components of the blended mixture (e.g., catalyst, polyether)

to interact, conforming surface portions with each other. The heating, with or without associated pressure, can operate in a sintering-like fashion to fuse the ionomer and any associated polymers or materials, including the catalyst and polyether, to form a cohesive mass, layer, or film following coating onto the substrate.

The polyether can include the following aspects. The polyether can include one or more polyalkylene oxides. The polyalkylene oxide can have an average molecular mass above about 20,000 g/mol. Certain embodiments can have molecular weights of about 100,000 g/mol, 400,000 g/mol, 1,000,000 g/mol, and 2,000,000 g/mol. Other embodiments can include various mixtures of molecular weights and ranges of molecular weights, including mixtures and ranges bounded by the preceding values. The polyalkylene oxide can include polyethylene oxide, polypropylene oxide, and/or polybutylene oxide. The polyalkylene oxide can be formed from a single alkylene oxide species or from a mixture of alkylene oxide species; e.g., a mixture of ethylene oxide and propylene oxide. Certain embodiments include where the polyalkylene oxide includes only polyethylene oxide. Where present, the polyethylene oxide can include polymers of ethylene oxide having a molecular mass above about 20,000 g/mol. Commercial examples of polyalkylene oxides include those sold under the tradenames Carbowax™ (Dow), Pluriol™ (BASF), and Dow P Series™ (Dow).

Various amounts of catalyst, ionomer, and polyether can be provided in the dry blend in forming the electrode. In particular, where the catalyst includes metal and/or metal alloy supported by carbon particles, various weight percentages of the metal and/or metal alloy supported by carbon particles, ionomer, and polyether can be used. Examples include 15-70 wt % metal and/or metal alloy supported by carbon particles, 15-50 wt % ionomer, 1-15 wt % polyether, and 0-5 wt % other components. Other embodiments can include 10-20% wt % metal and/or metal alloy supported by carbon particles, 5-15 wt % ionomer, and 5-20% polyether. The powder mixture that is blended to form the blended mixture can also be assembled using various proportions or ratios. For example, the catalyst, ionomer, and polyether can be provided in a 1:5:1 ratio, and certain embodiments can include catalyst ionomer, and polyether in a 2:1:1 ratio and a 1:1:1 ratio.

The liquid carrier can include the following aspects. Embodiments include where the liquid carrier includes an aqueous medium. The aqueous medium can include water along with minor amounts of other solvents, including water miscible solvents, surfactants, wetting agents, and surface tension modifiers that facilitate forming the slurry of the blended mixture with the liquid carrier. In certain embodiments, the liquid carrier can include only water. The liquid carrier can be combined with the blended mixture to form a slurry of the catalyst, the ionomer, and the polyether. Certain embodiments include where each particle in the powder mixture can have an average particle size of about 0.25 microns to about 0.5 microns. It is also possible to have the powder mixture in the dry blending include various sizes of the catalyst, the ionomer, and the polyether, where each component can have a different size or where at least one component has a different size than the other two components. The sizes of the catalyst, the ionomer, and the polyether can be tailored to effect different distributions thereof in the blended mixture and subsequent slurry following combination with the liquid carrier. Various amounts of the blended mixture and the liquid carrier can be used, with embodiments including anywhere from 4-6 parts of blended mixture to 1 part liquid carrier. In this way, the resulting slurry can take the form of a semiliquid mixture with the catalyst, the ionomer, and the polyether being generally insoluble in the liquid carrier. Placing the blended mixture in slurry form with the liquid carrier allows various means for transferring, dispensing, and distributing the slurry in forming the electrode.

The present methods can also include the following aspects. It is possible to comminute the blended mixture prior to forming the slurry of the blended mixture with the aqueous medium. Comminuting prior to forming the slurry can include various pulverizing, grinding, and milling methods that reduce the average particle size of the blended mixture. It is also possible to comminute one, two, or all three of the catalyst, the ionomer, and the polyether prior to dry blending powders of each to form the blended mixture. Comminuting prior to dry blending can include obtaining an average particle size for the blended mixture of about 0.25 microns to about 0.5 microns. Comminuting operations can include various known processes of crushing, grinding, cutting, and/or vibrating components to obtain a preselected particle size distribution and/or to provide a substantially uniform average particle size. Examples include the use of mills, such as a ball mill, various crushers, high pressure grinding rolls, and roller presses.

Forming a slurry of the blended mixture with an aqueous medium and subsequent coating thereof can include the following aspects. Formation of the slurry of the blended mixture with a liquid carrier can include a ratio of blended mixture to aqueous medium between about 4:1 to about 6:1, where an amount of liquid carrier can be slowly increased to the point where the blended mixture achieves a desired flowability and the resultant slurry presents characteristics necessary for optimal coating on the substrate. Certain embodiments include coating the slurry onto the substrate using a slot-die, where the slurry is delivered onto the substrate via a narrow slot positioned close to a surface of the substate. Slot-die coating allows for tailoring of wet-film coating thickness, the flow rate of the slurry, and the speed of the coated substrate relative to the slot-die head. In this manner, slot-die coating can achieve uniform films across large areas and provide films of desired thicknesses on various substrates. For example, where the substrate is provided as a moving web, a fixed slot-die head can continuously deposit the slurry thereon to provide a coating thickness based upon the slot dimensions, the flow rate of the slurry, the speed of the web, among other factors. It is also possible to apply coating films to each side of a substrate as well as to transfer a film from one substrate to another substrate. The slot-die coating step can also be integrated into scalable processes including roll-to-roll coating and sheet-to-sheet deposition systems. Other coating techniques can be used in applying the slurry onto the substrate to form a coated substrate, including spraying, dip coating, calendaring, roll-to-roll coating methods, etc.

The blended mixture, including the catalyst, solvent, and ionomer, can be combined with the liquid carrier in various ways to form the slurry. The slurry can be directly deposited on a proton exchange membrane and/or a gas diffusion layer (GDL) as the substrate to form an electrode thereon, or the slurry can be deposited onto a substrate to form an electrode thereon, where the electrode is subsequently transferred from the substrate to a PEM to form a membrane electrode assembly. The liquid carrier can be removed in forming the electrode. Certain methods can include transferring the electrode from the substrate to another substrate, such as a proton exchange membrane. Transfer can be effected by a pressing operation, roll-to-roll transfer, as well as other processes available in the art. Removal of the liquid carrier can include volatilizing the liquid carrier. Volatilizing the solvent can range from simple air drying to processes including the application of subatmospheric conditions or thermal energy. In certain embodiments, a combination of heat and vacuum can be used to remove the liquid carrier. A solid or semisolid electrode can remain on the surface after removal of all or substantially all of the liquid carrier. Removal of the liquid carrier and drying of the electrode can be improved by the presence of the polyether, which can minimize structural instabilities in the resulting electrode, including minimizing any cracking or crazing thereof.

The substrate can include the following aspects. The substrate can include one or more blanks and webs. In certain embodiments, the substrate can include a flexible polymeric web that can be continuously coated with the slurry on one or both sides thereof. The substrate can also include an ionomer, such as a sulfonated tetrafluoroethylene-based fluoropolymer-copolymer. Where the substrate includes an ionomer, the resulting electrode and substrate can be used to form a cathode in an MEA, which can further be incorporated into a fuel cell. The substrate can also include a fluoropolymer, where the resulting electrode can be used to form an anode in an MEA and in a fuel cell including such an MEA. Examples of fluoropolymer substrates include polytetrafluoroethylene and ethylene tetrafluoroethylene.

The coated substate can be further treated in various ways. Examples include where the coated substrate is further subjected to one or more laminating steps, including lamination with another substrate, exposed to various heat treatments, subjected to pressures, including nip rollers, pressure plates, and stamping plates, as well as various combinations of such treatments. It is possible to transfer a portion of the coating from the coated substrate onto one side of an ionomer membrane and it is further possible to transfer another portion of the coating of the coated substrate onto another side of the ionomer membrane.

Electrodes as manufactured by the methods provided herein can be utilized in various ways. One or more electrodes manufactured in accordance with the present technology can be used in making a membrane electrode assembly in conjunction with a proton-exchange membrane. A fuel cell can be constructed using the membrane electrode assembly and multiple fuel cells can be configured in fuel cell stacks. Such fuel cells and fuel cell stacks can provide electrical energy sources in various applications. Certain applications include vehicle applications.

In certain embodiments, the method of making an electrode can include the following aspects. The dry blending of fuel cell catalyst, such as Pt/C, Pt-alloy/C (e.g., Pt-Co, Pt—Ni, Pt—Fe), and/or IrRuOx, RuIrOx, IrOx/NbOx, with dry perfluorosulfonic acid (PFSA) ionomer powder along with high molecular weight polyethylene oxide (PEO) can be carried out in a high-speed blender with a high intensity bar. The resulting blended mixture of a dry fibrilized blend can be added to suitable particle size reducing equipment. The particle size can be reduced by comminuting to an average particle size range of about 0.25 microns to about 0.5 microns. The dry blended mixture can be combined with water in various ratios, preferably a ratio between about 4:1 to about 6:1 of dry blended mixture to water. The small amount of water can form the dry blended and optionally comminuted mixture into a dough/slurry to allow coating thereof. The coating process can be carried out using a slot-die on a substrate such as an ionomer (e.g., PFSA membrane), or a fluoropolymer, where the coated substrate can be further laminated in different heating zones at different temperatures and pressure treated using a nip roller to obtain a desired catalyst (e.g., Pt) loading, thickness, and electrode structure.

In certain embodiments, a cathode electrode can be coated on PFSA membrane and anode electrode can be coated on a fluoropolymer substrate, such as PTFE or ETFE. The anode electrode can be further laminated to a cathode half catalyst coated membrane (CCM). Alternatively, both the anode and the cathode can be coated onto PTFE or ETFE and laminated to a PFSA membrane at the same time. Alternatively, both the anode and the cathode electrode layers can be coated on PFSA simultaneously, or the cathode can be coated on the membrane and then the anode can be coated on the other side of the membrane.

Certain benefits and advantages accrue from the present methods and from electrodes, membrane electrode assemblies, and fuel cells incorporating one or more electrodes made using the present methods. These electrode processing and manufacturing methods can provide better electrode structures, which can militate against cracking and other imperfections in the resultant electrodes, obviate byproduct reactions of catalyst inks prepared with alcohols, and can militate leaching of electrode materials in use. The present methods of manufacture also minimize processing steps compared to prior methods of making electrodes. Economies of scale can further be realized, as the present methods can be practiced using webs of substrates and roll-to-roll coating and processing techniques.

EXAMPLE

An example embodiment of the present technology is provided with reference to the FIGURE enclosed herewith.

With reference to the FIGURE, an embodiment of a method of making an electrode according to the present technology is shown at 100. A powder mixture including a catalyst 105, an ionomer 110, and a polyether 115 is dry blended at 135 to form a blended mixture. Optionally, the catalyst 105 can be comminuted, as shown at 120, prior to the dry blending at 135. Likewise, the ionomer 110 and/or the polyether 115 can be comminuted prior to the dry bending at 135, as respectively shown at 125, 130. The blended mixture output of the dry blending at 135 can optionally be comminuted as shown at 140. Liquid carrier is combined with the blended mixture to form a slurry as shown at 145. The slurry is then coated onto a substrate, as provided at 150, to form a coated substrate, where the coating on the substrate provides the electrode. Although not shown in the FIGURE, it is understood that the electrode coating on the substrate can be further treated in various ways, including lamination with another substrate, heat application, and/or pressure application. It is also possible to transfer all or a portion of the coating from the coated substrate onto one side of an ionomer membrane. Another portion of the coating of the coated substrate can be transferred onto another side of the ionomer membrane. The resulting electrode can be used to make a membrane electrode assembly in conjunction with a proton-exchange membrane, and the membrane electrode assembly can be used to make a fuel cell. The fuel cell can be part of a fuel cell stack and can be used as a power source for a vehicle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of making an electrode, comprising:
   dry blending a powder mixture including a catalyst, an ionomer, and a polyether to form a blended mixture;
   forming a slurry of the blended mixture with a liquid carrier;
   coating the slurry onto a substrate to form a coated substrate; and
   drying the coating of the coated substrate to remove the liquid carrier and form the electrode, wherein the electrode includes the catalyst, the ionomer, and the polyether.

2. The method of claim 1, wherein the catalyst includes a member selected from a group consisting of a noble metal, a noble metal alloy, and combinations thereof.

3. The method of claim 1, wherein the catalyst includes a member selected from a group consisting of platinum/carbon, platinum alloy/carbon, iridium ruthenium oxide, ruthenium iridium oxide, iridium oxide/niobium oxide, and combinations thereof.

4. The method of claim 1, wherein the ionomer includes a sulfonated tetrafluoroethylene based fluoropolymer-copolymer.

5. The method of claim 1, wherein the polyether includes a polyalkylene oxide.

6. The method of claim 1, further comprising comminuting at least one of the catalyst, the ionomer, and the polyether prior to dry blending the powder mixture.

7. The method of claim 1, further comprising comminuting the blended mixture prior to forming the slurry of the blended mixture with the liquid carrier.

8. The method of claim 7, wherein comminuting the blended mixture includes obtaining an average particle size for the blended mixture of about 0.25 microns to about 0.5 microns.

9. The method of claim 1, wherein forming the slurry of the blended mixture with the liquid carrier includes a ratio of blended mixture to liquid carrier of about 4:1 to about 6:1.

10. The method of claim 1, wherein coating the slurry onto the substrate to form the coated substrate includes using a slot-die.

11. The method of claim 1, wherein the substrate is in the form of a web.

12. The method of claim 1, wherein the substrate includes an ionomer.

13. The method of claim 1, wherein the substrate includes a fluoropolymer to configure the electrode as an anode.

14. The method of claim 1, wherein the coated substrate is further treated by a member selected from a group consisting of: laminating with another substrate, heating, applying pressure, and combinations thereof.

15. The method of claim 1, further comprising transferring a portion of the coating from the coated substrate onto one side of an ionomer membrane.

16. The method of claim 15, further comprising transferring another portion of the coating of the coated substrate onto another side of the ionomer membrane.

17. An electrode made by the method of claim 1.

18. A membrane electrode assembly comprising:
    a proton-exchange membrane; and
    an electrode made by the method of claim 1.

19. The membrane electrode assembly of claim 18, further comprising another electrode made by the method of claim 1, the proton-exchange membrane disposed between the electrode and the another electrode.

20. A fuel cell comprising the membrane electrode assembly according to claim 18.

* * * * *